United States Patent
Hao et al.

(10) Patent No.: US 9,330,075 B2
(45) Date of Patent: May 3, 2016

(54) METHOD AND APPARATUS FOR IDENTIFYING GARBAGE TEMPLATE ARTICLE

(71) Applicant: Tencent Technology (Shenzhen) Company Limited, Shenzhen, Guangdong (CN)

(72) Inventors: Zhixin Hao, Shenzhen (CN); Jianguo He, Shenzhen (CN); Guoqiang Zhang, Shenzhen (CN); Xiaochen He, Shenzhen (CN)

(73) Assignee: Tencent Technology (Shenzhen) Company Limited (CN)

( * ) Notice: Subject to any disclaimer, the term of this patent is extended or adjusted under 35 U.S.C. 154(b) by 0 days.

(21) Appl. No.: 14/428,314

(22) PCT Filed: Sep. 17, 2013

(86) PCT No.: PCT/CN2013/083613
§ 371 (c)(1),
(2) Date: Mar. 13, 2015

(87) PCT Pub. No.: WO2014/040570
PCT Pub. Date: Mar. 20, 2014

(65) Prior Publication Data
US 2015/0227497 A1    Aug. 13, 2015

(51) Int. Cl.
*G06F 17/30* (2006.01)
*G06F 17/22* (2006.01)
(Continued)

(52) U.S. Cl.
CPC ............ *G06F 17/2247* (2013.01); *G06F 17/27* (2013.01); *G06F 17/30707* (2013.01);
(Continued)

(58) Field of Classification Search
CPC ............................ G06F 17/27; G06F 17/30867
See application file for complete search history.

(56) References Cited

U.S. PATENT DOCUMENTS

| 7,912,907 | B1 * | 3/2011 | Mantel | ................. H04L 12/585 706/52 |
| 2005/0015626 | A1 * | 1/2005 | Chasin | ............... H04L 63/0245 726/4 |

(Continued)

FOREIGN PATENT DOCUMENTS

| CN | 101350032 A | 1/2009 |
| CN | 101661468 A | 3/2010 |

(Continued)

OTHER PUBLICATIONS

International Searching Authority, The State Intellectual Property Office, Forms PCT/ISA/210/220/237 for IA Application No. PCT/CN2013/083613, International Search Report (Chinese), Dec. 19, 2013.

(Continued)

*Primary Examiner* — Sangwoo Ahn
(74) *Attorney, Agent, or Firm* — BrainSpark Associates, LLC

(57) ABSTRACT

Method and apparatus for identifying garbage template articles in network communication field are disclosed. The method includes: extracting a feature from an eligible microblog article to generate an article feature including a punctuation feature, a topic feature, a bracket feature, a link feature and an account name feature; acquiring a garbage template list including garbage template feature, i.e. an article feature whose frequency reaches a preset threshold, wherein they are extracted in a same way; identifying the microblog article as a garbage template article when the article feature is the same as the garbage template feature. The apparatus includes: a feature extracting module, an acquiring module, and an identifying module. Features of a microblog article are extracted to determine whether the microblog article is a garbage template article, so that garbage template articles in the present microblog platform can be identified effectively and search engine resources are saved.

12 Claims, 3 Drawing Sheets

(51) Int. Cl.
- *G06F 17/27* (2006.01)
- *H04L 29/06* (2006.01)
- *H04L 12/58* (2006.01)
- *H04L 29/08* (2006.01)

(52) U.S. Cl.
CPC .... *G06F17/30864* (2013.01); *G06F 17/30867* (2013.01); *H04L 51/12* (2013.01); *H04L 51/32* (2013.01); *H04L 63/1441* (2013.01); *H04L 67/10* (2013.01)

(56) References Cited

U.S. PATENT DOCUMENTS

| | | |
|---|---|---|
| 2011/0185236 A1 | 7/2011 | Watanabe et al. |
| 2011/0271179 A1* | 11/2011 | Jasko ............ G06F 17/30716 715/256 |

FOREIGN PATENT DOCUMENTS

| | | |
|---|---|---|
| CN | 101859309 A | 10/2010 |
| CN | 102622365 A | 8/2012 |
| CN | 102662965 A | 9/2012 |

OTHER PUBLICATIONS

International Searching Authority, The State Intellectual Property Office, Form PCT/ISA/237 for IA Application No. PCT/CN2013/083613, Written Opinion of the International Searching Authority (English translation), Dec. 19, 2013.

* cited by examiner

METHOD AND APPARATUS FOR IDENTIFYING GARBAGE TEMPLATE ARTICLE

The present application claims the priority benefit of Chinese Patent Application No. 201210344209.0 entitled "METHOD AND APPARATUS FOR IDENTIFYING GARBAGE TEMPLATE ARTICLE" and filed to the State Intellectual Property Office on Sep. 17, 2012, the contents of which are incorporated by reference herein in their entirety.

FIELD OF THE INVENTION

The disclosure relates to the technical field of network communications, and particularly, to a method and apparatus for identifying garbage template article.

BACKGROUND

With the rapid development of microblog, some users of microblog tend to develop a microblog APP (application) for the purpose of advertisement or campaign promotion, post article(s) to entice other users to click and to post and forward the article(s) automatically, which produces a great amount of template articles in similar formats within a short time, resulting in the existence of large amounts of garbage template articles on the microblog platform. Such garbage template articles are typically repetitive, or have some of their words modified randomly according to some rule or personal information of the forwarding person, contain little amount of information but have a huge data volume. According to statistics, garbage template articles account for about 10% of all the blogs. If these garbage template articles are not identified and filtered, search engine resource will be wasted, and tremendous repetitive templates will also seriously affect user experience.

Garbage template articles of the same kind have certain common features. At present, semantics included in the articles is mainly analyzed manually, so as to determine whether a microblog article is a garbage template article.

Manual identification is low in speed and efficiency, and unable to deal with the huge data amount of the microblog platform, and it is impossible to identify every and each piece of microblog article manually.

SUMMARY OF THE INVENTION

In order to effectively solve the problem that tremendous garbage template articles in the present microblog platform cannot be identified effectively, the disclosure provides a method and apparatus for identifying garbage template article.

According to an aspect of the invention, a method for identifying garbage template article is provided, wherein the method includes the steps of:

extracting a feature from an eligible microblog article to generate an article feature, wherein the article feature includes at least a punctuation feature, a topic feature, a bracket feature, a link feature and an account name feature;

acquiring a garbage template list which includes garbage template feature(s), a garbage template feature being an article feature whose frequency reaches a preset threshold, and the way to extract the garbage template feature being the same as the way to extract the article feature;

identifying the microblog article as a garbage template article when the article feature is the same as the garbage template feature in the garbage template list.

Particularly, the eligible microblog article may be a microblog article which is in an original form and contains link(s) and picture(s), and before extracting a feature from an eligible microblog article, the method may further include:

removing numbers and letters from the eligible microblog article, and removing the contents in various brackets from the microblog article while retaining the brackets.

Particularly, extracting a feature from the eligible microblog article may include:

segmenting the eligible microblog article with punctuations to generate segment numbers in order;

extracting the punctuation of each segment, using the extracted punctuations to constitute a string, and generating the punctuation feature;

extracting the topic and the corresponding segment number of the segment which has a topic for each segment, using the extracted topics and segment numbers to constitute a string, and generating the topic feature;

extracting the segment number and the corresponding type of brackets of the segment which has brackets for each segment, using the extracted segment numbers and type of brackets to constitute a string, and generating the bracket feature;

generating a sequence as the link feature according to whether there is a link in each segment;

generating a sequence as the account name feature according to whether there is an account name identity in each segment.

Moreover, the article feature may further include a content feature, and extracting a feature from the eligible microblog article may further include:

concatenating the remainder of each segment, resulted from removing all of the punctuation, topic, bracket, link and account name identity from each segment, sequentially together to generate the content feature.

Moreover, the article feature may further include a fore content feature, and extracting a feature from the eligible microblog article may further include:

concatenating the first predetermined number of bytes of the remainder of each segment, resulted from removing all of the punctuation, topic, bracket, link and account name identity from each segment, together sequentially to generate the fore content feature.

Moreover, the article feature may further include a rear content feature, and extracting a feature from the eligible microblog article may further include:

concatenating the last predetermined number of bytes of the remainder of each segment, resulted from removing all of the punctuation, topic, bracket, link and account name identity from each segment, together sequentially to generate the rear content feature.

According to another aspect of the invention, an apparatus for identifying garbage template article is provided, wherein the apparatus includes:

a feature extracting module for extracting a feature from an eligible microblog article to generate an article feature, wherein the article feature includes at least a punctuation feature, a topic feature, a bracket feature, a link feature and an account name feature;

an acquiring module for acquiring a garbage template list which includes garbage template feature(s), a garbage template feature being an article feature whose frequency reaches a preset threshold, and the way to extract the garbage template feature being the same as the way to extract the article feature;

an identifying module for identifying the microblog article as a garbage template article when the article feature is the same as the garbage template feature in the garbage template list.

Particularly, the apparatus may further include:

a preprocessing module for removing numbers and letters from an eligible microblog article and removing the contents in various brackets from the microblog article while retaining the brackets before a feature is extracted from the microblog article, the eligible microblog article being a microblog article which is in an original form and contains link(s) and picture(s).

Particularly, the feature extracting module may include:

a segmenting unit for segmenting the eligible microblog article with punctuations to generate segment numbers in order;

a punctuation feature unit for extracting the punctuation of each segment, using the extracted punctuations to constitute a string, and generating the punctuation feature;

a topic feature unit for extracting the topic and the corresponding segment number of the segment which has a topic for each segment, using the extracted topics and segment numbers to constitute a string, and generating the topic feature;

a bracket feature unit for extracting the segment number and the corresponding type of brackets of the segment which has brackets for each segment, using the extracted segment numbers and type of brackets to constitute a string, and generating the bracket feature;

a link feature unit for generating a sequence as the link feature according to whether there is a link in each segment;

an account name feature unit for generating a sequence as the account name feature according to whether there is an account name identity in each segment.

Moreover, the feature extracting module may further include:

a content feature unit for concatenating the remainder of each segment, resulted from removing all of the punctuation, topic, bracket, link and account name identity from each segment, sequentially together to generate the content feature.

Moreover, the feature extracting module may further include:

a fore content feature unit for concatenating the first predetermined number of bytes of the remainder of each segment, resulted from removing all of the punctuation, topic, bracket, link and account name identity from each segment, together sequentially to generate the fore content feature.

Moreover, the feature extracting module may further include:

a rear feature unit for concatenating the last predetermined number of bytes of the remainder of each segment, resulted from removing all of the punctuation, topic, bracket, link and account name identity from each segment, together sequentially to generate the rear content feature.

According to another aspect of the invention, an apparatus for identifying garbage template article is provided, wherein the apparatus includes:

one or more processors; and memory;

the memory stores one or more programs configured to be executed by the one or more processors and including instructions for the following operations:

extracting a feature from an eligible microblog article to generate an article feature, wherein the article feature includes at least a punctuation feature, a topic feature, a bracket feature, a link feature and an account name feature;

acquiring a garbage template list which includes garbage template feature(s), a garbage template feature being an article feature whose frequency reaches a preset threshold, and the way to extract the garbage template feature being the same as the way to extract the article feature;

identifying the microblog article as a garbage template article when the article feature is the same as the garbage template feature in the garbage template list.

Preferably, the one or more programs may further include instructions for the following operations:

removing numbers and letters from the eligible microblog article, and removing the contents in various brackets from the microblog article while retaining the brackets.

Preferably, the one or more programs may further include instructions for the following operations:

segmenting the eligible microblog article with punctuations to generate segment numbers in order;

extracting the punctuation of each segment, using the extracted punctuations to constitute a string, and generating the punctuation feature;

extracting the topic and the corresponding segment number of the segment which has a topic for each segment, using the extracted topics and segment numbers to constitute a string, and generating the topic feature;

extracting the segment number and the corresponding type of brackets of the segment which has brackets for each segment, using the extracted segment numbers and type of brackets to constitute a string, and generating the bracket feature;

generating a sequence as the link feature according to whether there is a link in each segment;

generating a sequence as the account name feature according to whether there is an account name identity in each segment.

Preferably, the one or more programs may further include instructions for the following operations:

concatenating the remainder of each segment, resulted from removing all of the punctuation, topic, bracket, link and account name identity from each segment, sequentially together to generate the content feature.

Preferably, the one or more programs may further include instructions for the following operations:

concatenating the first predetermined number of bytes of the remainder of each segment, resulted from removing all of the punctuation, topic, bracket, link and account name identity from each segment, together sequentially to generate the fore content feature.

Preferably, the one or more programs may further include instructions for the following operations:

concatenating the last predetermined number of bytes of the remainder of each segment, resulted from removing all of the punctuation, topic, bracket, link and account name identity from each segment, together sequentially to generate the rear content feature.

Advantageous effects brought by the embodiments of the disclosure may include:

by extracting a plurality of features of a microblog article to determine whether the microblog article is a garbage template article, the method and apparatus for identifying garbage template article provided by the embodiments of the disclosure solve the problem that tremendous garbage template articles in the present microblog platform cannot be identified effectively, and achieve an effect of automatically identifying a garbage template article efficiently and accurately by means of only logical operation on article features extracted from a microblog article without manual intervention.

DESCRIPTION OF THE DRAWINGS

In order to more clearly illustrate the technical solutions of the embodiments of the disclosure, accompanying drawings used in description of the embodiments will be briefly described in the following. Obviously, the drawings described herein are only examples of the disclosure, and those skilled in the art may achieve other drawings based on these drawings without creative work.

DETAILED DESCRIPTION

In order to make the objects, technical solutions and advantages of the invention more apparent, embodiments of the invention will be further illustrated in details in connection with accompanying drawings.

Figure 1:
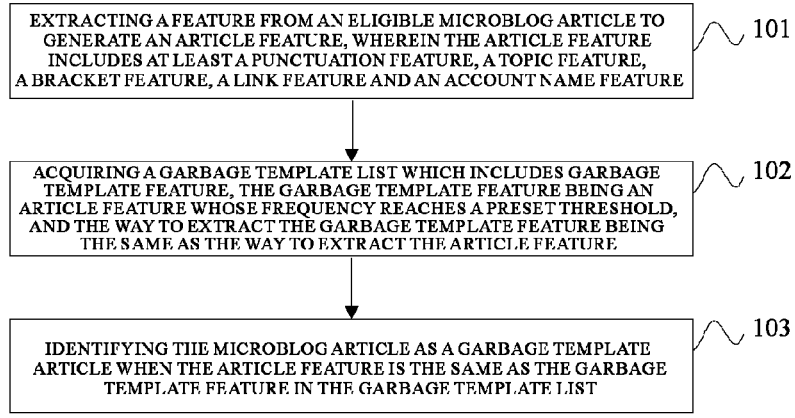
FIG. 1 is a flow chart of a method for identifying garbage template article according to an embodiment of the disclosure.

FIG. 1 is a flow chart of a method for identifying garbage template article according to an embodiment of the disclosure. Referring to FIG. 1, the embodiment may includes:

step 101, extracting a feature from an eligible microblog article to generate an article feature, wherein the article feature includes at least a punctuation feature, a topic feature, a bracket feature, a link feature and an account name feature;

step 102, acquiring a garbage template list which includes garbage template feature(s), a garbage template feature being an article feature whose frequency reaches a preset threshold, and the way to extract the garbage template feature being the same as the way to extract the microblog article feature;

the microblog article feature is the article feature extracted from the microblog article in step 101.

step 103, identifying the microblog article as a garbage template article when the article feature is the same as the garbage template feature in the garbage template list.

Particularly, the eligible microblog article in the embodiment of the disclosure may be a microblog article which is in an original form and contains link(s) and picture(s), and before extracting a feature from an eligible microblog article, the method may further include:

removing numbers and letters from the eligible microblog article, and removing the contents in various brackets from the microblog article while retaining the brackets.

Particularly, extracting a feature from the eligible microblog article may include:

segmenting the eligible microblog article with punctuations to generate segment numbers in order;

extracting the punctuation of each segment, using the extracted punctuations to constitute a string, and generating the punctuation feature;

extracting the topic and the corresponding segment number of the segment which has a topic for each segment, using the extracted topics and segment numbers to constitute a string, and generating the topic feature;

extracting the segment number and the corresponding type of brackets of the segment which has brackets for each segment, using the extracted segment numbers and type of brackets to constitute a string, and generating the bracket feature;

generating a sequence as the link feature according to whether there is a link in each segment;

generating a sequence as the account name feature according to whether there is an account name identity in each segment.

Moreover, the article feature may further include a content feature, and extracting a feature from the eligible microblog article may further include:

concatenating the remainder of each segment, resulted from removing all of the punctuation, topic, bracket, link and account name identity from each segment, sequentially together to generate the content feature.

Moreover, the article feature may further include a fore content feature, and extracting a feature from the eligible microblog article may further include:

concatenating the first predetermined number of bytes of the remainder of each segment, resulted from removing all of the punctuation, topic, bracket, link and account name identity from each segment, together sequentially to generate the fore content feature.

Moreover, the article feature may further include a rear content feature, and extracting a feature from the eligible microblog article may further include:

concatenating the last predetermined number of bytes of the remainder of each segment, resulted from removing all of the punctuation, topic, bracket, link and account name identity from each segment, together sequentially to generate the rear content feature.

Moreover, after identifying a microblog article as a garbage template article, a predetermined operation is performed which may include any of not displaying, not feedback to a terminal as a search result, deleting, shielding and alarming, etc.

By extracting a plurality of features of a microblog article to determine whether the article is a garbage template article, the method for identifying garbage template article provided by the embodiment of the disclosure solves the problem that tremendous garbage template articles in the present microblog platform cannot be identified effectively, and achieves an effect of automatically identifying a garbage template article efficiently and accurately by means of only logical operation on article features extracted from a microblog article without manual intervention.

Figure 2:
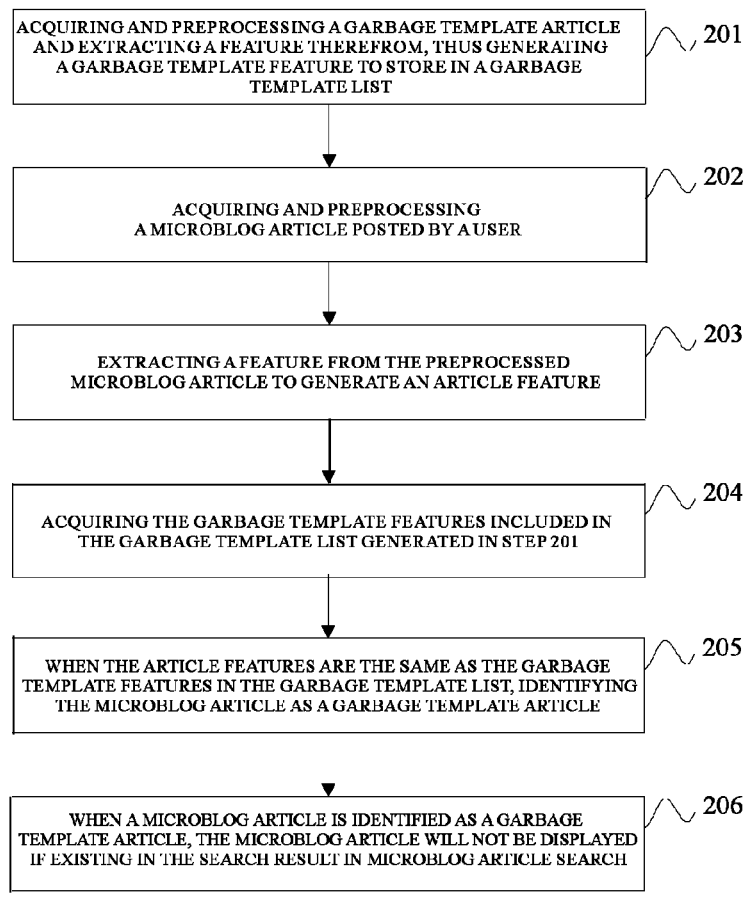
FIG. 2 is a flow chart of a method for identifying garbage template article according to another embodiment of the disclosure.

FIG. 2 is a flow chart of a method for identifying garbage template article according to another embodiment of the disclosure. Referring to FIG. 2, the apparatus may include:

Step 201, acquiring and preprocessing a garbage template article and extracting a feature therefrom, thus generating a garbage template feature to store in a garbage template list;

particularly, the step may include the two of a preprocessing sub-step and a feature extracting sub-step:

(1) acquiring and preprocessing a garbage template article:

a microblog article is generally in an original form and contains link(s) and picture(s), removing numbers and letters from the microblog article, and removing the contents in various brackets from the microblog article while retaining the brackets.

Taking "443 days for QQ level acceleration" and "337 days for QQ level acceleration" as an example. Except the numbers, all the contents in such types of garbage template articles are the same; therefore, removing letters and numbers can improve the recall rate of the template. Since some type of template only changes the contents in the brackets, the contents in various brackets in the article such as ( ), [ ], < >, ( ), [ ], 《》, " " etc. are removed while the brackets themselves need to be retained for use in subsequent feature extraction.

(2) extracting a feature from the preprocessed garbage template article to generate a garbage template feature containing a whole content feature, a garbage template feature containing a fore content feature, and a garbage template feature containing a rear content feature, respectively, including:

segmenting the preprocessed garbage template article with punctuations such as a comma, a fullstop, an exclamatory mark, a question mark, a semi-colon etc., to generate segment numbers in order;

a. extracting the punctuation of each segment sequentially, using the extracted punctuations to constitute a string, and generating the punctuation feature;

b. for each segment, determining whether it includes a topic; if yes, extracting the corresponding topic and the corresponding segment number of the segment, using the extracted topics and segment numbers to constitute a string, and generating the topic feature; for example, when Segment 2 has #Topic 1# and Segment 4 has #Topic 2#, "Topic 1, 2; Topic 2, 4" is generated;

c. extracting the segment number and the corresponding type of brackets of the segment which has brackets for each segment, using the extracted segment numbers and type of brackets to constitute a string, and generating the bracket feature; for example, when Segment 1 has ( ) and Segment 3 has { }, "1 ( ), 3 { }" is generated;

d. generating a sequence as the link feature according to whether there is a link in each segment; for example, 1 is resulted if Segments 1 and 2 each have a link, and 0 is resulted if neither of Segments 3 and 4 have a link, thus generating "1100";

e. generating a sequence as the account name feature according to whether there is an account name identity in each segment; for example, 1 is resulted if Segments 1 and 3 each have an account name identity, and 0 is resulted if neither of Segments 2 and 4 have an account name identity, thus generating "1010".

f. concatenating the remainder of each segment, resulted from removing all of the punctuation, topic, bracket, link and account name identity from each segment, sequentially together to generate the content feature.

g. concatenating the first predetermined number of bytes of the remainder of each segment, resulted from removing all of the punctuation, topic, bracket, link and account name identity from each segment, together sequentially to generate the fore content feature; for example, the first four bytes of the contents are retrieved to generate the fore content feature;

h. concatenating the last predetermined number of bytes of the remainder of each segment, resulted from removing all of the punctuation, topic, bracket, link and account name identity from each segment, together sequentially to generate the rear content feature; for example, the last four bytes of the contents are retrieved to generate the fore content feature;

the above punctuation feature, topic feature, bracket feature, link feature, account name feature and content feature may be sequentially combined to generate the garbage template feature containing a content feature;

the above punctuation feature, topic feature, bracket feature, link feature, account name feature and fore content feature may also be sequentially combined to generate the garbage template feature containing a fore content feature;

the above punctuation feature, topic feature, bracket feature, link feature, account name feature and rear content feature may as well be sequentially combined to generate the garbage template feature containing a rear content feature.

It is important to note that the sequence of extracting the above punctuation feature, topic feature, bracket feature, link feature, account name feature, content feature, fore content feature and rear content feature may be replaced, which is not limited in the embodiment of the disclosure. However, the garbage template feature containing a whole content feature, the garbage template feature containing a fore content feature and the garbage template feature containing a rear content feature shall be generated according to the sequence of extracting features, and the sequence of subsequent feature extraction from a microblog article shall be the same as that of garbage template feature extraction.

(3) stored the generated garbage template feature containing a whole content feature, the garbage template feature containing a fore content feature and the garbage template feature containing a rear content feature into a garbage template list;

It is important to note that the garbage template feature in the embodiment of the disclosure is an article feature whose frequency reaches a preset threshold, and the way to extract the garbage template feature is the same as the way to extract the microblog article feature; for example, an eligible microblog article is preprocessed and features are extracted therefrom as mentioned above regularly every 12 hours, generating an article feature containing a content feature; an article feature containing a fore content feature and an article feature containing a rear feature, the frequency of each feature is calculated off-line, and when the frequency reaches a threshold, the article is regarded as a garbage template article, and the extracted three of the article feature containing a content feature, the article feature containing a fore content feature and the article feature containing a rear feature are identified as garbage template features and stored into the garbage template list, so as to update the garbage template features in the garbage template list constantly.

Step 202, acquiring and preprocessing a microblog article posted by a user;

particularly, preprocessing a microblog article includes two sub-steps of:

(1) first, determining whether the microblog article is in an original form and contains link(s) and picture(s);

wherein most of the garbage template articles are posted in an original form; in order to achieve viral promotional effect, the garbage generally contains link(s) which, if clicked by a user, an article will be posted automatically; and in order to be attractive, most of the garbage template articles contain picture(s).

(2) when the microblog article is in an original form and contains link(s) and picture(s), removing numbers and letters from the microblog article, and removing the contents in various brackets from the microblog article while retaining the brackets.

First, for an microblog article which is in an original form and contains link(s) and picture(s), removing numbers and letters therefrom, such as removing number "443" from "443 days for QQ level acceleration"; next, since some type of template only changes the contents in the brackets, the contents in various brackets in the article such as ( ), [ ], < >, ( ), [ ], << >>, " " etc. are removed while the brackets themselves need to be retained for use in subsequent feature extraction.

Step 203, extracting a feature from the preprocessed microblog article to generate an article feature;

particularly, the way to extract a feature in this step is the same as the above step 201, which will omitted herein. The article feature extracted in this step includes at least: punctuation feature, topic feature, bracket feature, link feature, account name feature, wherein a content feature, a fore content feature and a rear content feature of the microblog article may also be extracted.

Wherein, the above extracted punctuation feature, topic feature, bracket feature, link feature, account name feature and content feature of the microblog article may be sequentially combined to generate a whole article feature;

the above extracted punctuation feature, topic feature, bracket feature, link feature, account name feature and fore content feature of the microblog article may also be sequentially combined to generate a fore article feature;

the above extracted punctuation feature, topic feature, bracket feature, link feature, account name feature and rear content feature of the microblog article may as well be sequentially combined to generate a rear article feature.

It is important to note that the sequence of extracting the above punctuation feature, topic feature, bracket feature, link feature, account name feature, content feature, fore content feature and rear content feature may be replaced, which is not limited in the embodiment of the disclosure. However, the whole article feature, the fore article feature and the rear article feature shall be generated according to the sequence of extracting features, and shall be the same as the sequence of the garbage template features generated in step 201.

Step 204, acquiring the garbage template features included in the garbage template list generated in step 201;

particularly, acquiring the garbage template feature containing a whole content feature, the garbage template feature containing a fore content feature and the garbage template feature containing a rear content feature generated in step 201.

Step 205, when the article features are the same as the garbage template features in the garbage template list, identifying the microblog article as a garbage template article;

particularly, when any of the whole article feature, the fore article feature and the rear article feature generated in step 203 is the same as the garbage template feature in the garbage template list, identifying the microblog article as a garbage template article; particularly, when the whole article feature is the same as the garbage template feature containing a whole content feature, identifying the microblog article as a garbage template article; or when the fore article feature is the same as the garbage template feature containing a fore content feature, identifying the microblog article as a garbage template article; or when the rear article feature is the same as the garbage template feature containing a rear content feature, identifying the microblog article as a garbage template article.

When any of the above conditions is met, the microblog article is identified as a garbage template article. If only the whole article feature is matched with the garbage template feature containing a whole content feature, it may occur that microblog articles originated from the same template are not identified due to difference in a certain name; such a case may be identified by adding the garbage template feature containing a fore content feature and the garbage template feature containing a rear content feature, increasing the recall rate of template identification. This might possibly result in misjudgment, however, since punctuation feature, topic feature, bracket feature, link feature, account name feature are combined to make the judgment, the probability of misjudgment is relatively low.

Step 206, when a microblog article is identified as a garbage template article, the microblog article will not be displayed if existing in the search result in microblog article search.

Wherein when a microblog article is identified as a garbage template article, for subsequent microblog article search of whichever form, the microblog article will not be displayed even if existing in the search result.

By extracting a plurality of features of a microblog article to determine whether the microblog article is a garbage template article, the method for identifying garbage template article provided by the embodiment of the disclosure solves the problem that tremendous garbage template articles in the present microblog platform cannot be identified effectively, and achieves an effect of automatically identifying a garbage template article efficiently and accurately by means of only logical operation on article features extracted from a microblog article without manual intervention.

Figure 3:
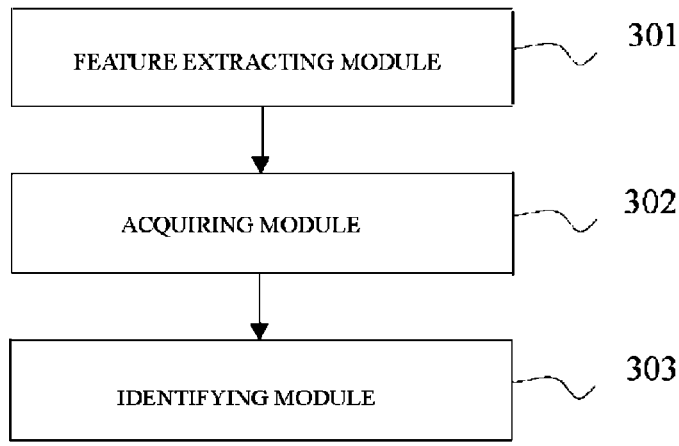
FIG. 3 is a structural schematic diagram of an apparatus for identifying garbage template article according to an embodiment of the disclosure.

FIG. 3 is a structural schematic diagram of an apparatus for identifying garbage template article according to an embodiment of the disclosure. Referring to FIG. 3, the apparatus may include:

a feature extracting module 301 for extracting a feature from an eligible microblog article to generate an article feature, wherein the article feature includes at least a punctuation feature, a topic feature, a bracket feature, a link feature and an account name feature;

an acquiring module 302 for acquiring a garbage template list which includes garbage template feature(s), a garbage template feature being an article feature whose frequency reaches a preset threshold, and the way to extract the garbage template feature being the same as the way to extract the article feature;

an identifying module 303 for identifying the microblog article as a garbage template article when the article feature is the same as the garbage template feature in the garbage template list.

Figure 4:
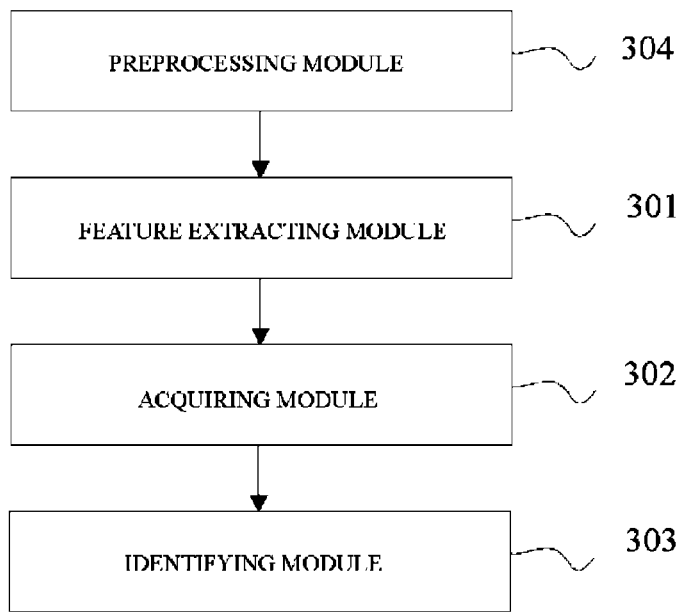
FIG. 4 is a structural schematic diagram of an apparatus for identifying garbage template article according to another embodiment of the disclosure.

Particularly, the apparatus may further include, as shown in FIG. 4:

a preprocessing module 304 for removing numbers and letters from an eligible microblog article and removing the contents in various brackets from the microblog article while retaining the brackets before a feature is extracted from the microblog article, the eligible microblog article being a microblog article which is in an original form and contains link(s) and picture(s).

Particularly, the feature extracting module 301 may include:

a segmenting unit for segmenting the eligible microblog article with punctuations to generate segment numbers in order;

a punctuation feature unit for extracting the punctuation of each segment, using the extracted punctuations to constitute a string, and generating the punctuation feature;

a topic feature unit for extracting the topic and the corresponding segment number of the segment which has a topic for each segment, using the extracted topics and segment numbers to constitute a string, and generating the topic feature;

a bracket feature unit for extracting the segment number and the corresponding type of brackets of the segment which has brackets for each segment, using the extracted segment numbers and type of brackets to constitute a string, and generating the bracket feature;

a link feature unit for generating a sequence as the link feature according to whether there is a link in each segment;

an account name feature unit for generating a sequence as the account name feature according to whether there is an account name identity in each segment.

Moreover, the feature extracting module 301 may further include:

a content feature unit for concatenating the remainder of each segment, resulted from removing all of the punctuation, topic, bracket, link and account name identity from each segment, sequentially together to generate the content feature.

Moreover, the feature extracting module 301 may further include:

a fore content feature unit for concatenating the first predetermined number of bytes of the remainder of each segment, resulted from removing all of the punctuation, topic, bracket, link and account name identity from each segment, together sequentially to generate the fore content feature.

Moreover, the feature extracting module 301 may further include:

a rear feature unit for concatenating the last predetermined number of bytes of the remainder of each segment, resulted from removing all of the punctuation, topic, bracket, link and account name identity from each segment, together sequentially to generate the rear content feature.

By extracting a plurality of features of a microblog article to determine whether the microblog article is a garbage template article, the apparatus for identifying garbage template article provided by the embodiment of the disclosure solves the problem that tremendous garbage template articles in the present microblog platform cannot be identified effectively, and achieves an effect of automatically identifying a garbage template article efficiently and accurately by means of only logical operation on article features extracted from a microblog article without manual intervention.

It is important to note that when the above apparatus for identifying garbage template article provided by the embodiment identifies a garbage template article, the division of respective functional modules is only for illustration. In practical applications, the above functions can be allocated to different functional modules to be accomplished as necessary; that is to say, the internal structure of the apparatus for identifying garbage template article can be divided into different functional modules to accomplish all or part of the functions described above. Besides, the above apparatus provided by the embodiment belongs to the same concept as the embodiment of the method for identifying garbage template article; for the details of the particular implementation, please refer to the method embodiment, which will be omitted herein.

Figure 5:
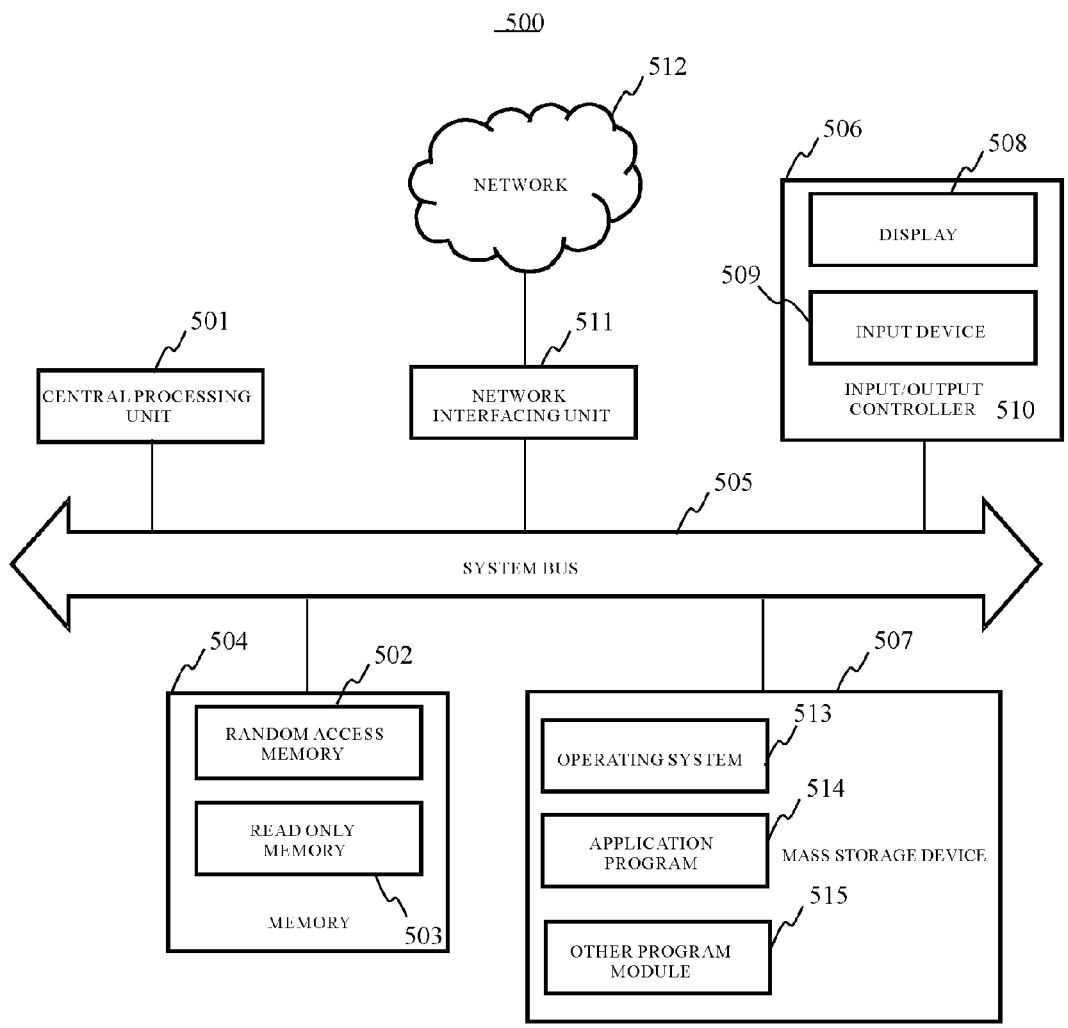
FIG. 5 is a structural schematic diagram of an apparatus for identifying garbage template article according to an embodiment of the disclosure.

FIG. 5 is a structural schematic diagram of an apparatus for identifying garbage template article according to an embodiment of the disclosure. The apparatus for identifying garbage template article 500 may be a server, and the apparatus for identifying garbage template article 500 may include a central processing unit (CPU) 501, and a system memory 504 including random access memory (RAM) 502 and read only memory (ROM) 503, and a system bus 505 connecting the system memory 504 and the central processing unit 501. The apparatus for identifying garbage template article 500 may further include a basic input/output (I/O) system 506 facilitating information transmission between various devices inside the computer and a mass storage device 507 for storing operating system 513, application program 514 and other program modules 515.

The basic input/output (I/O) system 506 may include a display 508 for displaying information and an input device 509 such as mouse, keyboard, etc. for a user to input information, wherein both the display 508 and the input device 509 are connected to the central processing unit 501 via an input/output controller 510 connected to the system bus 505. The basic input/output (I/O) system 506 may further include the input/output controller 510 to receive and process input from plural other input devices such as mouse, keyboard or electronic touch pen etc. Similarly, the input/output controller 510 may further provide output for the display screen, printer or other types of output devices.

The mass storage device 507 may be connected to the central processing unit 501 via a mass storage controller (not shown) connected to the system bus 505. The mass storage device 507, together with its associated computer readable medium, can provide non-volatile storage for a client device 500. That is to say, the mass storage device 507 may include a computer readable medium (not shown) such as a hard disk or a CD-ROM driver.

In general, the computer readable medium may include computer storage medium and communication medium. The computer storage medium may include volatile and non-volatile, removable and irremovable medium implemented by any method or technique for storing information such as computer readable instruction, data structure, program module or other data etc. The computer storage medium may include RAM, ROM, EPROM, EEPROM, flash memory or other solid storing technique, CD-ROM, DVD or other optical storage, cassette, tape, magnetic disk memory or other magnetic storage devices. Of course, those skilled in the art will appreciate that the computer storage medium is not limited to the above. The above system memory 504 and mass storage device 507 may be collectively called memory.

According to various embodiments of the disclosure, the apparatus for identifying garbage template article 500 may be executed by connecting to a remote computer on a network via Internet or the like. In other words, the apparatus for identifying garbage template article 500 may be connected to the network 512 via a network interfacing unit 511 connected on the system bus 505, or to say, connected to other types of network or remote computer system (not shown) via the network interfacing unit 511.

The memory may further include one or more programs stored therein and configured to perform the method for identifying garbage template article provided in the embodiment shown in FIG. 1 and the one provided in the embodiment shown in FIG. 2 by one or more central processing units 501.

As will be appreciated by those skilled in the art, some or all the steps of the above embodiments can be realized in hardware, or accomplished by instructing relative hardware via program, which is stored in a non-transitory computer readable storage medium. The storage medium may be read only memory, magnetic disk or optic disk, etc.

The above described embodiments are merely exemplary embodiments of the invention, but not intended to limit the scope of the invention. The scope of the invention is defined by the attached claims as well as their equivalents. Any modifications, equivalent alternations and improvements that are made within the spirit and scope of the invention should be included in the protection scope of the invention.

What is claimed is:

1. A method for identifying garbage template article, comprising:

extracting, by a processor, a feature from an eligible microblog article to generate an article feature, wherein the article feature comprises at least a punctuation feature, a topic feature, a bracket feature, a link feature and an account name feature;

acquiring, by the processor, a garbage template list which comprises garbage template feature, the garbage template feature being an article feature whose frequency reaches a preset threshold, and the way to extract the garbage template feature being the same as the way to extract the article feature; and identifying, by the processor, the microblog article as a garbage template article when the article feature is the same as the garbage template feature in the garbage template list, wherein the eligible microblog article is a microblog article which is in an original form and contains link and picture, and before extracting a feature, by the processor, from an eligible microblog article, the method further comprises:

removing, by the processor, numbers and letters from the eligible microblog article, and removing the contents in various brackets from the microblog article while retaining the brackets;

wherein extracting, by the processor, a feature from the eligible microblog article comprises:

segmenting, by the processor, the eligible microblog article with punctuations to generate segment numbers in order;

extracting, by the processor, the punctuation of each segment, using the extracted punctuations to constitute a string, and generating the punctuation feature;

extracting, by the processor, the topic and the corresponding segment number of the segment which has a topic for each segment, using the extracted topics and segment numbers to constitute a string, and generating the topic feature;

extracting, by the processor, the segment number and the corresponding type of brackets of the segment which has brackets for each segment, using the extracted segment numbers and type of brackets to constitute a string, and generating the bracket feature;

generating, by the processor, a sequence as the link feature according to whether there is a link in each segment; and generating, by the processor, a sequence as the account name feature according to whether there is an account name identity in each segment.

2. The method according to claim 1, wherein the article feature further comprises a content feature, and extracting, by the processor, a feature from the eligible microblog article further comprises:

concatenating, by the processor, the remainder of each segment, resulted from removing all of the punctuation, topic, bracket, link and account name identity from each segment, sequentially together to generate the content feature.

3. The method according to claim 1, wherein the article feature further comprises a fore content feature, and extracting, by the processor, a feature from the eligible microblog article further comprises:

concatenating, by the processor, the first predetermined number of bytes of the remainder of each segment, resulted from removing all of the punctuation, topic, bracket, link and account name identity from each segment, together sequentially to generate the fore content feature.

4. The method according to claim 1, wherein the article feature further comprises a rear content feature, and extracting, by the processor, a feature from the eligible microblog article further comprises:

concatenating, by the processor, the last predetermined number of bytes of the remainder of each segment, resulted from removing all of the punctuation, topic, bracket, link and account name identity from each segment, together sequentially to generate the rear content feature.

5. An apparatus for identifying garbage template article, comprising:

a processor, which is configured to:

extract a feature from an eligible microblog article to generate an article feature, wherein the article feature comprises at least a punctuation feature, a topic feature, a bracket feature, a link feature and an account name feature;

acquire a garbage template list which comprises garbage template feature, the garbage template feature being an article feature whose frequency reaches a preset threshold, and the way to extract the garbage template feature being the same as the way to extract the article feature;

identify the microblog article as a garbage template article when the article feature is the same as the garbage template feature in the garbage template list; and remove numbers and letters from an eligible microblog article and remove the contents in various brackets from the microblog article while retaining the brackets before a feature is extracted from the microblog article, wherein the eligible microblog article is a microblog article which is in an original form and contains link and picture;

wherein the processor is further configured to:

segment the eligible microblog article with punctuations to generate segment numbers in order;

extract the punctuation of each segment, use the extracted punctuations to constitute a string, and generate the punctuation feature;

extract the topic and the corresponding segment number of the segment which has a topic for each segment, use the extracted topics and segment numbers to constitute a string, and generate the topic feature;

extract the segment number and the corresponding type of brackets of the segment which has brackets for each segment, use the extracted segment numbers and type of brackets to constitute a string, and generate the bracket feature;

generate a sequence as the link feature according to whether there is a link in each segment; and generate a sequence as the account name feature according to whether there is an account name identity in each segment.

6. The apparatus according to claim 5, wherein the processor is further configured to:

concatenate the remainder of each segment, resulted from removing all of the punctuation, topic, bracket, link and account name identity from each segment, sequentially together to generate the content feature.

7. The apparatus according to claim 5, wherein the processor is further configured to:

concatenate the first predetermined number of bytes of the remainder of each segment, resulted from removing all of the punctuation, topic, bracket, link and account name identity from each segment, together sequentially to generate the fore content feature.

8. The apparatus according to claim 5, wherein the processor is further configured to:

concatenate the last predetermined number of bytes of the remainder of each segment, resulted from removing all of the punctuation, topic, bracket, link and account name identity from each segment, together sequentially to generate the rear content feature.

9. An apparatus for identifying garbage template article, comprising:

one or more processors; and
memory;

the memory storing one or more programs configured to be executed by the one or more processors and comprising instructions for the following operations:

extracting a feature from an eligible microblog article to generate an article feature, wherein the article feature comprises at least a punctuation feature, a topic feature, a bracket feature, a link feature and an account name feature;

acquiring a garbage template list which comprises garbage template feature, the garbage template feature being an article feature whose frequency reaches a preset threshold, and the way to extract the garbage template feature being the same as the way to extract the article feature;

identifying the microblog article as a garbage template article when the article feature is the same as the garbage template feature in the garbage template list; and removing numbers and letters from the eligible microblog article, and removing the contents in various brackets from the microblog article while retaining the brackets;

wherein the one or more programs further comprise instructions for the following operations:

segmenting the eligible microblog article with punctuations to generate segment numbers in order;

extracting the punctuation of each segment, using the extracted punctuations to constitute a string, and generating the punctuation feature;

extracting the topic and the corresponding segment number of the segment which has a topic for each segment, using the extracted topics and segment numbers to constitute a string, and generating the topic feature;

extracting the segment number and the corresponding type of brackets of the segment which has brackets for each segment, using the extracted segment numbers and type of brackets to constitute a string, and generating the bracket feature;

generating a sequence as the link feature according to whether there is a link in each segment; and generating a sequence as the account name feature according to whether there is an account name identity in each segment.

10. The apparatus according to claim 9, wherein the one or more programs further comprise instructions for the following operations:

concatenating the remainder of each segment, resulted from removing all of the punctuation, topic, bracket, link and account name identity from each segment, sequentially together to generate the content feature.

11. The apparatus according to claim 9, wherein the one or more programs further comprise instructions for the following operations:

concatenating the first predetermined number of bytes of the remainder of each segment, resulted from removing all of the punctuation, topic, bracket, link and account name identity from each segment, together sequentially to generate the fore content feature.

12. The apparatus according to claim 9, wherein the one or more programs further comprise instructions for the following operations:

concatenating the last predetermined number of bytes of the remainder of each segment, resulted from removing all of the punctuation, topic, bracket, link and account name identity from each segment, together sequentially to generate the rear content feature.

* * * * *